April 12, 1927.
W. E. BRUCE
1,624,210
FERTILIZER DISTRIBUTOR
Filed Nov. 14, 1925    2 Sheets-Sheet 2
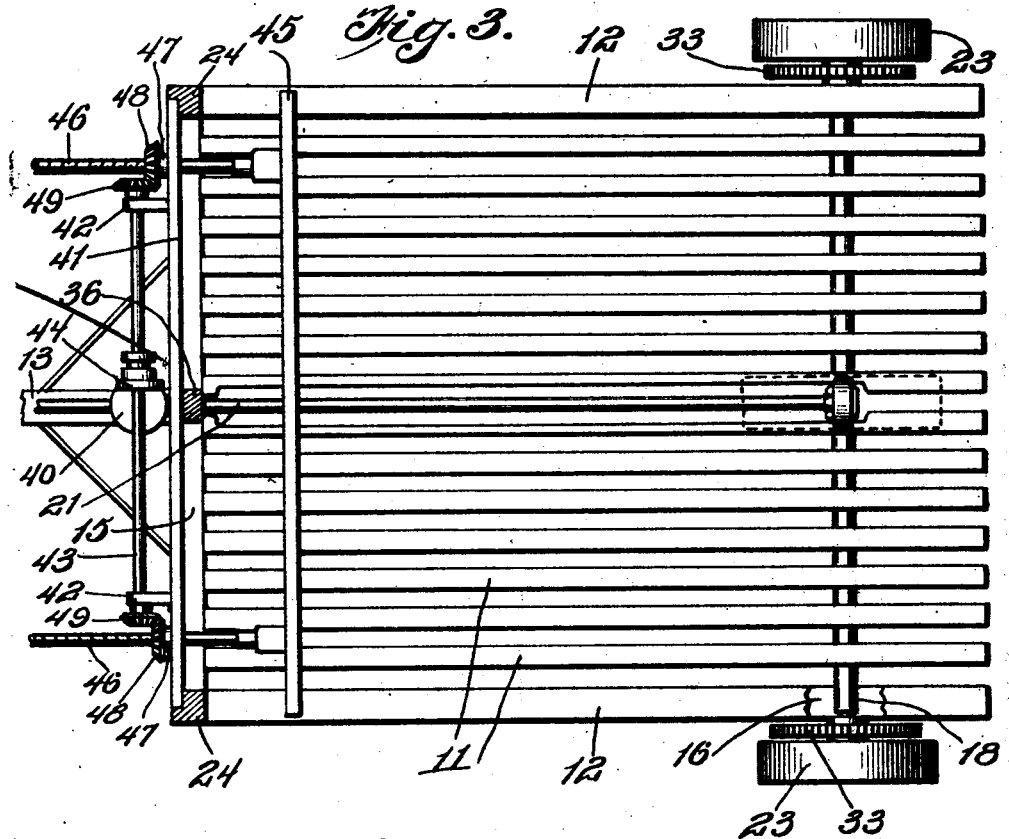
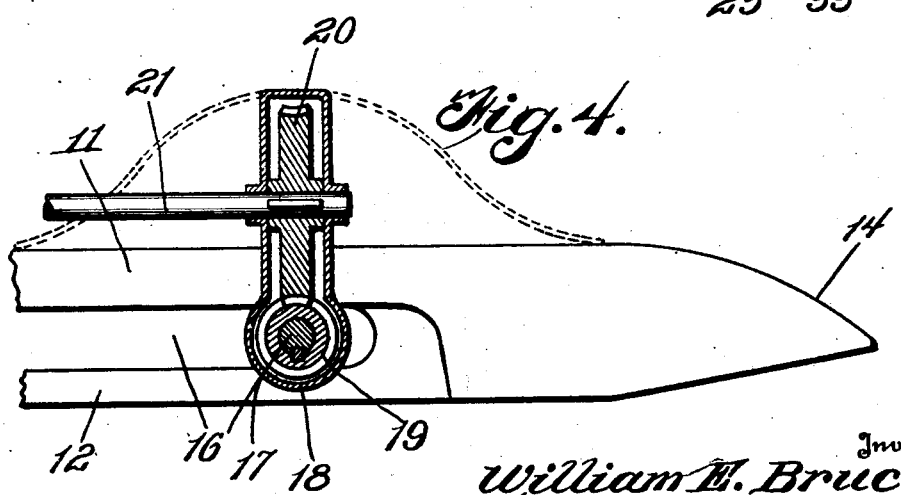
Inventor
William E. Bruce
By Watson E. Coleman
Attorney Patented Apr. 12, 1927.

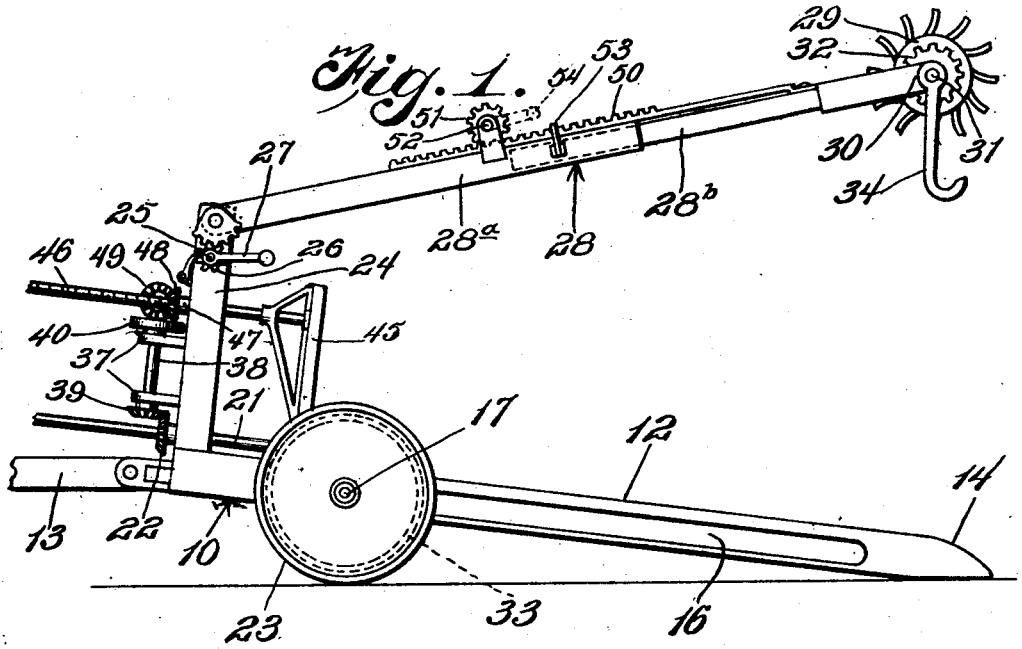
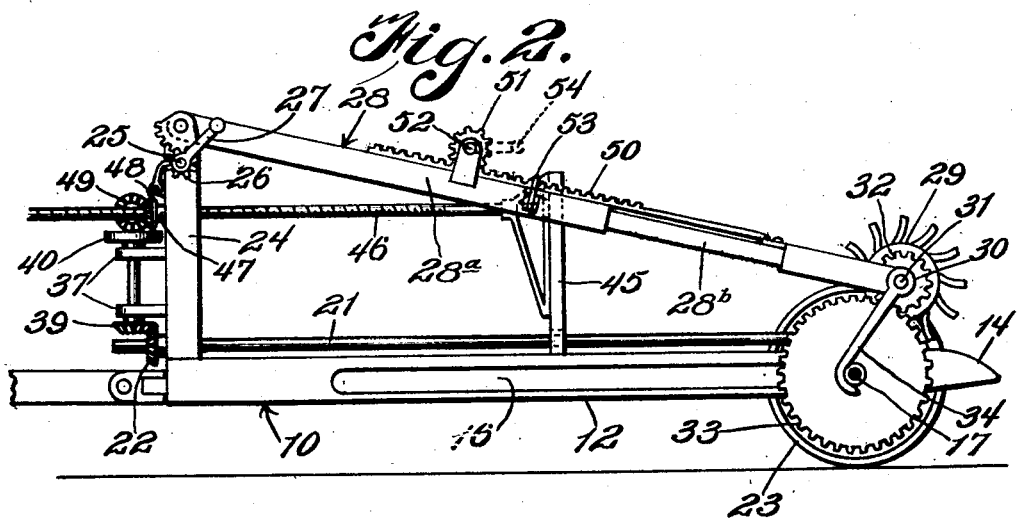

1,624,210

UNITED STATES PATENT OFFICE.

WILLIAM E. BRUCE, OF MIRANDO CITY, TEXAS.

FERTILIZER DISTRIBUTOR.

Application filed November 14, 1925. Serial No. 69,149.

This invention relates to fertilizer distributors and more particularly to a device of this character employing a toothed distributing drum together with a buck or push board for feeding the fertilizer to the drum.

An important object of the invention is to provide a device of this character which may be very readily loaded and which includes means whereby the supporting platform is lowered into engagement with the ground by movement of the vehicle in one direction, thus permitting the platform when in this position to be forced beneath a pile of fertilizer to load the same.

A further object of the invention is to provide in a device of this character means whereby the fertilizer distributor drum may be moved into and out of its distributing position so as to permit uninterrupted loading of the platform.

A further object of the invention is to provide in a device of this character means for controlling the operation of the buck board to regulate the speed of movement thereof which is readily controlled and automatically thrown out of operation during movement of the distributor in a direction wherein the platform is lowered for loading.

A still further object of the invention is to modify the construction shown in my copending application, Serial No. 63,724, filed October 20, 1925, for fertilizer or straw spreaders, to enable the platform shifting mechanism thereof to be employed with the drum and buck board type of distributing mechanism.

These and other objects I attain by the construction shown in the accompanying drawings, wherein for the purpose of illustration is shown a preferred embodiment of my invention and wherein:—

Figure 1 is a side elevation of a fertilizer distributor constructed in accordance with my invention, the parts being shown in the position which they occupy during the period when the distributor is being pushed into a pile of fertilizer;

Figure 2 is a similar view showing the relation of the parts when the distributor is being employed as such and is being drawn;

Figure 3 is a plan view of the distributor;

Figure 4 is an enlarged sectional view showing the manner of providing a take-off drive for the buck or push board, a shield for the housing being indicated in dotted lines.

Referring now more particularly to the drawings, the numeral 10 generally designates a platform, shown in the present instance as consisting of a plurality of parallel teeth 11 and side members 12 combining to form a buck rake. The buck rake has attached thereto a tongue 13 so constructed that the rake may be either pushed or pulled, as is found desirable. The side members 12 each have at one end a shoe section 14, and at their opposite ends are secured to a rear frame member 15. Each side member is formed with a slot 16 for the reception of an axle 17 which extends beneath the teeth 11.

The central portion of the axle passes through a housing 18 and within this housing has secured thereto a worm 19 which meshes with a worm gear 20 secured to a shaft 21 which extends longitudinally of the buck rake and is suitably supported from the rear frame member 15. Rearwardly of this frame member, this shaft 21 his splined thereto a bevel pinion 22. It will be noted that the axle may move from end to end of the slots 16 and that at all times there is a driving connection between this axle and the shaft 21 to drive the bevel pinion 22. The ends of the axle have mounted thereon supporting wheels 23 of such size that when the axle 17 is arranged at the rear ends of the slots 16, the shoes 14 and the forward end of the teeth 11 contact with the ground while when the axle is at the opposite ends of the slots, the rear end of the platform is supported from the tongue 13 and the entire platform is supported in spaced relation to the ground.

Arising from the rear member 15 are supporting standards 24, each of which has associated therewith a rotatable shaft 25 to which a pinion 26 is secured and one end of which shaft is provided with a handle 27. Pivoted to the upper ends of the standards 24 are a pair of distributor supporting arms 28 for a distributor 29 which is rotatably mounted within the outer or forward ends of these arms, as at 30. The shaft 31 of this distributor has secured thereto at each end thereof gear wheels 32 which, when the distributor is in the position shown in Figure 2 and the axle is at the outer or forward ends of the slots, mesh with pinions 33 secured to the axle 17. Engagement of the gears 32 with the pinions 33 may be maintained by means of latches 34 which have at their ends hooks 35 for engaging over the axle 17, these latches being rotatably mounted upon the shaft 31.

Arising from the rear cross member 15 adjacent the center thereof is a further standard 36 from which extends rearwardly a pair of bearings 37 having journaled therein a vertical shaft 38, the lower end of which is provided with a bevel gear 39 meshing with the pinion 22. At the upper end of this shaft, a friction drive disk 40 is secured. The standards 24 and 36 are preferably connected by a transverse supporting element 41 from which project rearwardly bearings 42 having disposed therein a horizontal shaft 43 extending transversely of the platform. This shaft has splined thereto a friction wheel 44 engaging with the friction drive disk 40 and shiftable so that it may engage this disk at any point on the transverse diameter thereof so that the shaft 43 may be driven at a selected speed in either direction whenever the shaft 21 is rotating.

A vertically extending buck board 45 has its lower edge resting upon the upper surfaces of the teeth 11 and has secured thereto adjacent opposite ends thereof a pair of worm shafts 46 extending longitudinally of the platform 10 directed at their rear ends through the transverse member 41. Supported from the transverse support 41 for rotation about the shafts 46 are worm nuts 47 exteriorly formed as gears 48 which mesh with pinions 49 secured to the shaft 43. It will be obvious that rotation of this shaft 43 will cause the buck board to advance toward the outer ends of the teeth or be retracted toward the rear cross member 15, the direction of movement depending upon the direction of rotation of this shaft.

In the operation of the device, when it is desired to load the same, the platform is pushed into the pile of fertilizer which it is desired to load. During pushing of the platform, the axle 14 will be disposed at that end of the slot 16 next adjacent the rear frame member and the shoes 14 will be in engagement with the ground. The buck board will, of course, at this time be arranged immediately adjacent the standards 24 and 36 and the arms 28 will be positioned to hold the drum 29 in elevated position so that it will not interfere with loading of the platform. After the load is in position upon the platform, the drum is dropped so that it rests against the top of the load and the platform moved in the opposite direction. This causes the load to be withdrawn from the pile, its withdrawal from the platform being prevented by the elevation of the platform which takes place at this time, breaking the load away from the remainder of the pile and by the fact that the weight of the distributor resists tendency of the load to slide from the platform. At this time, the friction disk 44 is disposed centrally of the drive disk 40 so that the shaft 43 is not driven and there is no movement of the buck board. After the load has been fully separated from the pile and it is desired to start distributing, the arms 28 are forced downwardly until the gears 32 mesh with the pinions 33 and the latches 34 then placed in position. The friction disk 44 is shifted to the proper side of the friction drive disk with the result that the buck board is slowly moved toward the free ends of the teeth 11, forcing before it the fertilizer upon the platform so that this fertilizer is brought into engagement with the distributing drum and by this drum is scattered upon the field. After the distributing is completed, the friction disk 44 is moved to the opposite side of the friction drive wheel 40. This reverses the direction of operation of the shaft 43 and causes the buck board to retreat toward the standards 24 and 36 until it is in the proper position for reloading the machine. It will be obvious that the buck board may be moved in either direction regardless of the direction of movement of the platform and the speed of this movement may be controlled by controlling the position of the disk 44 upon the friction drive wheel 40.

It will be obvious that the length of the platform will render the arms 28 excessively long and that accordingly these arms will be considerably in the way and tend to overbalance the platform. These arms are accordingly made extensible, being formed in two telescopically engaged sections 28$^a$ and 28$^b$, the sections being moved to extended or retracted positions by racks 50 carried by the sections 28$^b$ and meshing with pinions 51 mounted upon a shaft 52 journaled upon the sections 28$^a$. This shaft may be held in any adjusted position by a latch 53 and is operated through a suitable crank 54. In addition to permitting the arms to be shortened when not in use, this feature is important in that it enables cramping of the load in event it extends beyond the free ends of the fingers 11 of the platform for the arms may be extended beyond the end of the load and then drawn inwardly, pushing the load before them on to the platform until the hooks 34 can be engaged with the axle.

It will also be obvious that the construction hereinbefore set forth is obviously capable of a certain range of change and modification without materially departing from the spirit of the invention and I accordingly do not limit myself to such specific structure except as hereinafter claimed.

I claim:—

1. In a device of the type described, a platform, means for moving the platform in opposite directions, means operated by reversal of movement of the platform for causing one end of the platform to move into or out of engagement with the ground, a buck board movable from end to end of the platform and means operable by movement of the platform for shifting the buck board upon the platform in either direction.

2. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to the other thereof, a buck board movable from end to end of the platform and an operative connection between said buck board and said axle for shifting said buck board in either direction on the platform during movement of the platform in either direction over the ground.

3. In a device of the type described, a platform, means for moving the platforms in opposite directions, means operated by reversal of movement of the platform for causing one end of the platform to move into or out of engagement with the ground including a wheel supported axle for the platform freely shiftable from one end of the platform to the other thereof, a buck board movable from end to end of the platform and means operatively connecting the buck board and axle for shifting the buck board upon the platform including coacting elements controlled by the operator to reverse the direction of movement of the buck board upon the platform during movement of the platform in either direction, said coacting elements having a neutral point.

4. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to the other thereof, a buck board movable from end to end of the platform, means operatively connecting the buck board and axle for shifting the buck board upon the platform, a distributor drum normally supported above and from the platform and movable into proximity to the platform and means for connecting the distributor drum when in the last named position to the axle to be driven thereby during movement of the platform in one direction.

5. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to and from the other thereof, a distributor drum normally supported above the platform and movable to a position in proximity to the platform and means for connecting the distributor drum when in the last named position to the axle to be driven thereby during movement of the platform in one direction.

6. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to and from the other thereof, a distributor drum normally supported above the platform and movable to a position in proximity to the platform and means for connecting the distributor drum when in the last named position to the axle to be driven thereby during movement of the platform in one direction, including a shaft for the distributor, gears on said shaft and pinions on said axle meshing with the gears of the shaft when the platform is moving in said direction and the distributor is in said position.

7. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to and from the other thereof, a distributor drum normally supported above the platform and movable to a position in proximity to the platform, means for connecting the distributor drum when in the last named position to the axle to be driven thereby during movement of the platform in one direction, including a shaft for the distributor, gears on said shaft and pinions on said axle meshing with the gears of the shaft when the platform is moving in said direction and the distributor is in said position and means for latching the shaft and axle against separation.

8. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to the other thereof, a buck board movable from end to end of the platform, a transversely extending shaft arranged at one end of the platform, longitudinally extending worms secured to the buck board and projecting adjacent said shaft, gear nuts on said worms, gears on said shaft engaging the gears of said gear nuts, and means for rotating said transversely extending shaft including a shaft driven from the axle, 9. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to the other thereof, a buck board movable from end to end of the platform, a transversely extending shaft arranged at one end of the platform, longitudinally extending worms secured to the buck board and projecting adjacent said shaft, gear nuts on said worms, gears on said shaft engaging the gears of said gear nuts, means for rotating said transversely extending shaft including a shaft driven from the axle and extending longitudinally of the platform, a vertical shaft, coacting gears upon the vertical and longitudinally extending shafts and a driving connection between the upper end of the vertical shaft and the transversely extending shaft.

10. In a device of the type described, a platform, means for moving the platform in opposite directions, means operated by reversal of movement of the platform for causing one end of the platform to move into or out of engagement with the ground including a wheel supported axle for the platform freely shiftable from one end of the platform to the other thereof, a buck board movable from end to end of the platform, a transversely extending shaft arranged at one end of the platform, longitudinally extending worms secured to the buck board and projecting adjacent said shaft, gear nuts on said worms, gears on said shaft engaging the gears of said gear nuts, means for rotating said transversely extending shaft including a shaft driven from the axle and extending longitudinally of the platform, a vertical shaft, coacting gears upon the vertical and longitudinally extending shafts, a driving connection between the upper end of the vertical shaft and the transversely extending shaft, comprising a friction drive disk upon the upper end of the vertical shaft and a friction disk shiftable upon the transverse shaft and coacting with said friction drive disk.

In testimony whereof I hereunto affix my signature.

WILLIAM E. BRUCE.